Jan. 18, 1938.  A. MELHMAN ET AL  2,105,948
SALES TAX CHECK MACHINE
Filed April 13, 1936  2 Sheets-Sheet 1
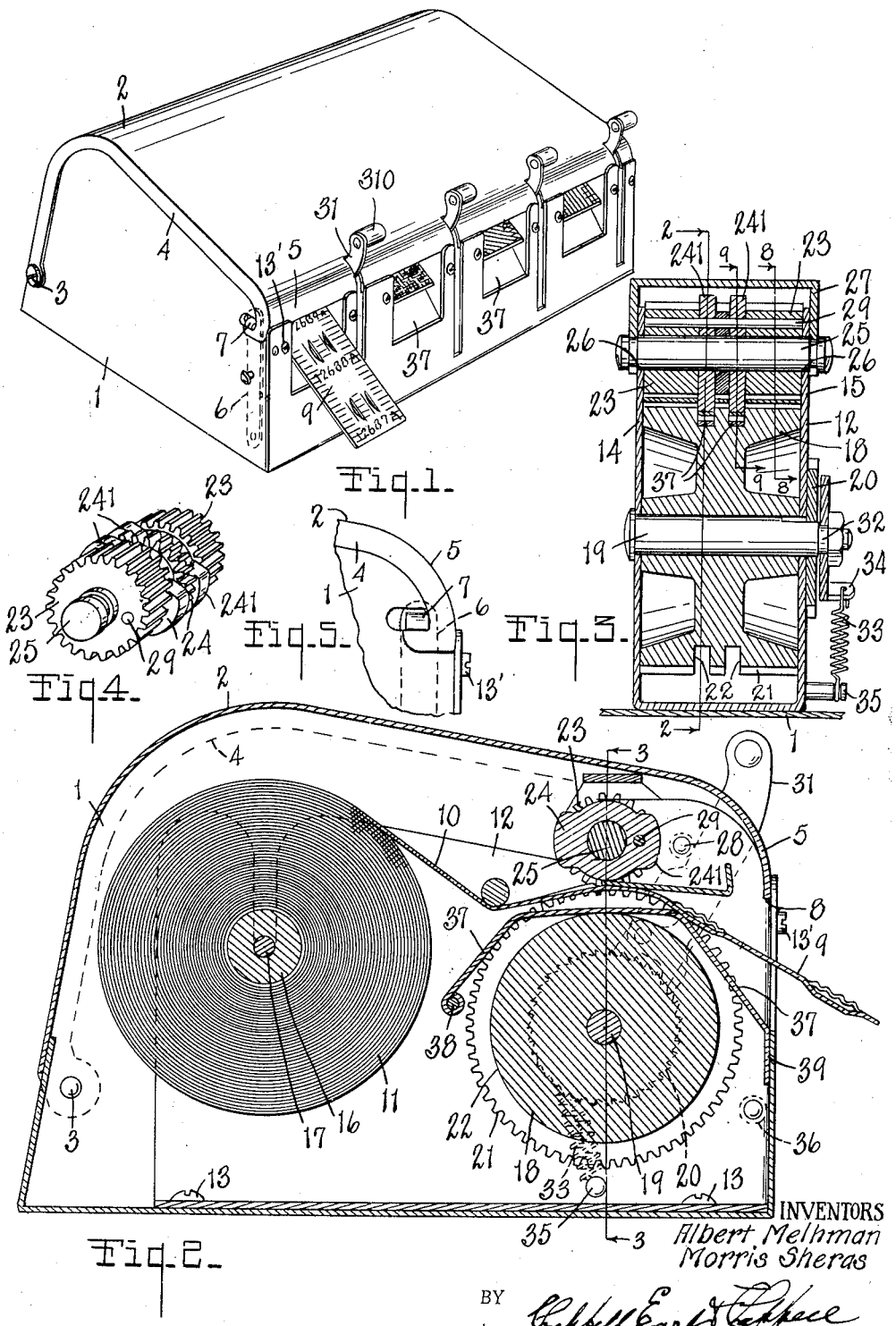

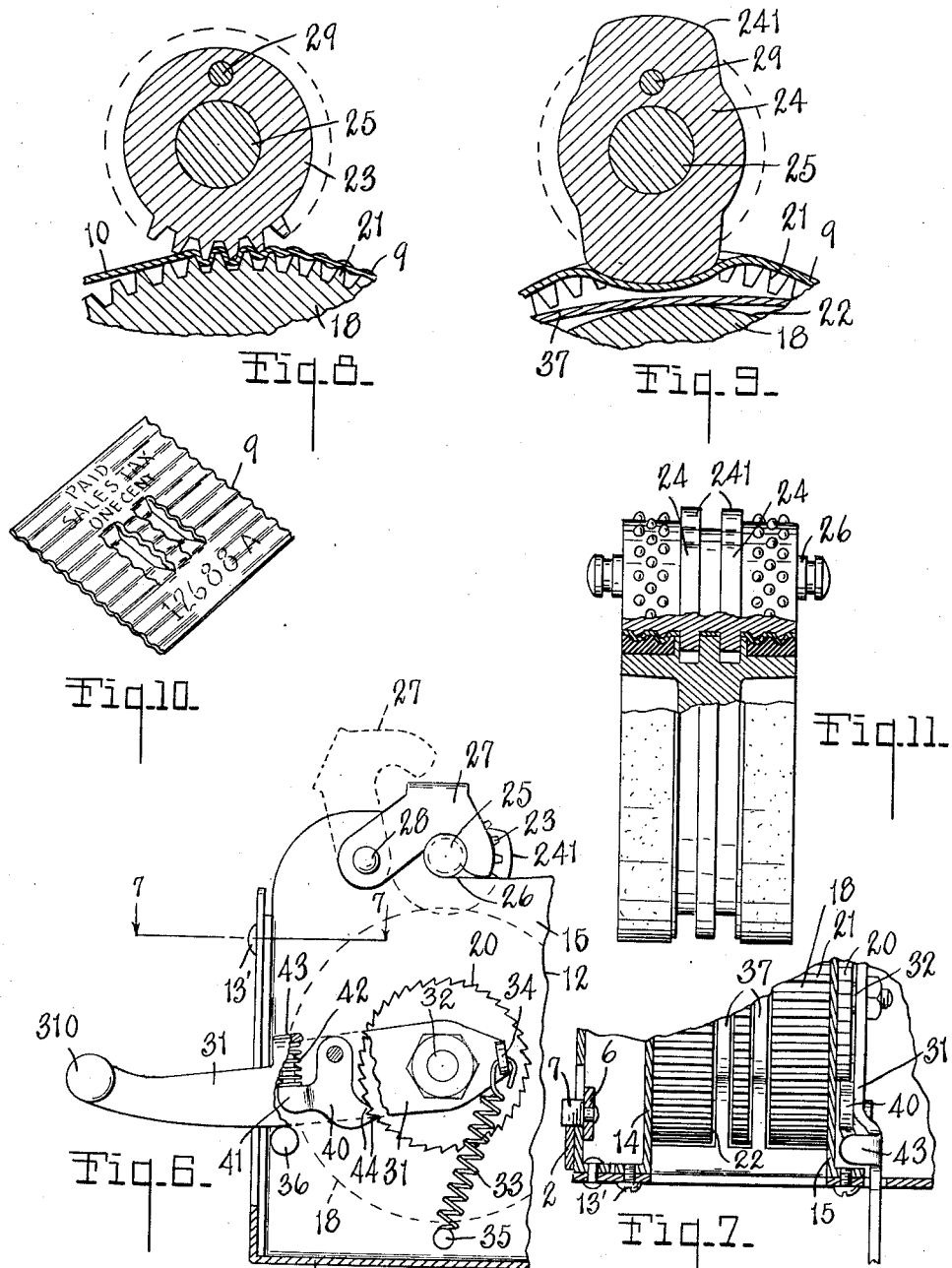

Patented Jan. 18, 1938

2,105,948

UNITED STATES PATENT OFFICE 2,105,948

SALES TAX CHECK MACHINE

Albert Melhman, Detroit, and Morris Sheras, Manistee, Mich., assignors to Tax-Auditor Systems, Inc., Detroit, Mich.

Application April 13, 1936, Serial No. 74,152

10 Claims. (Cl. 101—3)

This invention relates to improvements in a machine or means for cancelling sales tax checks or receipts.

The objects of the invention are:

First, to provide an effective means of delivering such sales tax receipts from a roll or strip and for cancelling the same.

Second, to provide such a corrugating and slitting device which is effective and simple in its operation.

Third, to provide a device which corrugates and slits sales tax checks or receipts for cancellation, and in which there is assured a positive feed of sales tax receipts for cancellation and delivery to the tax payer.

Further objects relating to details will appear from the detailed description to follow and is illustrated in the accompanying drawings, in which:

Fig. 1 is a detailed perspective view of a multiple sales tax strip delivering device in use.

Fig. 2 is an enlarged detail sectional elevation of a unit taken on line 2—2 of Fig. 3.

Fig. 3 is an enlarged detail vertical sectional elevation through the corrugating rolls and their actuating means taken on line 3—3 of Fig. 2.

Fig. 4 is a detail perspective view of the corrugating and slitting pinion means.

Fig. 5 is a detail view of the latch system for retaining the cover in place which cover carries the severing blades for the sales tax receipts.

Fig. 6 is an enlarged detail elevation view of one of the units showing the ratchet, the pinion roll retaining means and the roll retainer in dotted lines in unlatched position, the outer case being in section.

Fig. 7 is a detail sectional view on line 7—7 of Fig. 6 showing in substantially full size the method of securing the units in place, the latch, and details for operating the corrugating rolls.

Fig. 8 is a detail sectional view on line 8—8 of Fig. 3, showing the corrugating rolls in operation.

Fig. 9 is a detail sectional view on line 9—9 of Fig. 3, showing the slitting means in operation.

Fig. 10 is a detail view of one of the cancelled sales tax checks.

Fig. 11 is a detail view showing a modification of the corrugations of the feed and corrugating rolls.

The parts will be identified by their numerals of reference which are the same in all the views.

1 is the outer casing which contains several of the cancelling units which are mounted and secured therein. This case 1 is provided with a cover 2 pivoted at 3, the cover being flanged at 4 and down-turned at the front edge at 5 and provided with a spring latch 6 having an engaging lug 7, which projects at each end for the purposes of manipulation. The lower edge of the down-turned portion 5 of the cover 2 serves as the severing edge for the sales tax ticket 9 from the strip 10 provided in a roll 11 as the sales tax tickets are delivered from the machine. As many rolls of strips of sales tickets are provided as there are delivery units in the machine. Each delivery unit consists of a frame 12 which is secured in the bottom of the casing by screws 13, see Fig. 2. This is extended into vertical side walls 14 and 15, see Fig. 3. The roll 11 is supported on a core 16 and revolves on the spindle 17 which extends between the side walls 14 and 15, see Fig. 2.

A corrugated roll 18 is carried on the driven spindle 19 which is provided with the ratchet wheel 20 to actuate it, see Figs. 3, 6 and 7, the same being also indicated in part by dotted lines in Fig. 2. This roll is provided with corrugations 21 on its face parallel with its axis and with deep circumferential grooves 22 seen particularly in Figs. 2, 3 and 9. The corresponding corrugating pinion 23, which also carries the slitting knives 24, is corrugated and made up in a series of sections, see particularly Fig. 3, which are carried on the shaft 25 supported in a suitable bearing 26. It is retained in the bearing by latch piece 27 pivoted on pin 28, which pin also constitutes the stop for the ratchet lever, see Fig. 6. A through pin 29 retains these parts in alinement and is retained between the side walls 14 and 15 of the section of the machine. They may revolve on shaft 25.

The slitting knives 24 are preferably made on separate disks carried on the same shaft and retained in alinement with the corrugating pinion by the through pin 29. They have projecting portions 241 which project into the grooves 22 on the roll 18 and operate like revolving shears to depress the central portion of a sales tax ticket and cut it against the ends of the corrugations 21 and the sides of the grooves 22, the stripper blades 37, as hereinafter described, serving to strip the same outwardly when the strip 10 passes the slitting portion.

A ratchet lever 31 with finger button 310 is pivoted on the shouldered pivot 32 on the end of the shaft 19 to turn roll 18. Return spring 33 is provided for the ratchet lever connected thereto by the lug 34 and to the pin 35 on the casing 12. A lower stop pin 36 is provided for the lever 30.

Stripper blades 37 are supported on the pins 38 at the inner end and are disposed tangentially across the corrugating roll in the grooves 22 and rest against the front of the case at 39 so that when the sales tax strip 10 is advanced it will be forced into this groove by the cutters and will be carried or stripped out again, the slitted portion being restored to the position it occupied before being severed in the tax receipt check 9.

On the ratchet lever 31 we provide a special construction of pawl 40 having a lug 41 with a spring 42 reacting between the same and a lug 43 on the said lever. The pawl 40 we provide with double engaging teeth 44 which are spaced at half the distance of the ratchet teeth so that they engage the ratchet at very short intervals.

In the operation of the device, a roll of printed uncancelled sales tax receipts or checks is placed within the machine and the same is threaded through the corrugating rolls. The operator, to deliver one or a predetermined number of checks, depresses the lever 31 by pressing on the finger button 310 which is preferably like a small crank handle. This drives the roll 18 the predetermined amount and the operator then seizes the sales tax check 9 and severs it against the severing edge 8.

As many of these units as are desired are placed within the casing and they are held by the screws 13, 13 at the bottom and by screws 13' at the front, as seen in Figs. 1 and 6.

While we prefer the corrugations parallel with the axis, the same being very effective and thus produced very simply, they may be oblique. In Fig. 11, we show a modification in which little pin heads are made use of to corrugate the ticket, but these are not so desirable and effective as the complete cross corrugations.

Where the sales tax tickets are made of comparatively tough material, they may be pulled out by hand to the right amount and may then be torn off. This would make a very simple and very effective means for corrugating and delivering the tickets but the ratchet lever with the positive drive is much to be preferred.

We have shown the structure in detail as preferred by us, but we are aware that the same can be very considerably varied without departing from the spirit of our invention, so far as the delivery device is concerned. While we prefer the complete transverse corrugations on the ticket and claim the same specifically with the slitting, we wish to claim broadly the matter of corrugating and roughening the surface as well. The tickets cancelled as we have shown can be done completely and effectively with the plain surface of the part cut down and supported by the corrugated parts and we wish to claim this feature broadly as to an effective cancellation of the stamp without undue mutilation.

Having thus described our invention, what we claim as new and desire to secure by Letters Patent is:

1. A unit structure for delivering a sales tax strip comprising side walls, a casing, a main corrugated roll with corrugations parallel to its axis, a circumferential groove on the face of said corrugated roll, a driving shaft for supporting said roll, a ratchet wheel on said shaft, a ratchet lever pivoted to the end of said shaft with its arm projecting beyond the casing of the machine, a stop for said lever when in the elevated position, a corrugated pinion coacting with said roll, a projecting slitting cutter projecting from the face of said pinion and in register with and cooperating with the circumferential grooves in said roll to centrally slit a sales tax check as it is fed between the roller and pinion, a cross shaft between the side walls on which said pinion is journaled, a cross shaft for pivotal support of a roll of sales tax receipts between the side walls of said unit, stripping blades extending tangentially through the groove in said corrugating roll for raising and stripping the slitted portion of a check as the strip is advanced by the feeding means, and a severing blade supported in relation to said strip for severing it as the sales checks are fed out.

2. A unit structure for delivering a sales tax strip comprising side walls, a main corrugated roll with corrugations parallel to its axis, a circumferential groove at the center of said corrugated roll, a shaft for supporting said roll, a corrugating pinion coacting with said roll, a projecting slitting cutter extending from the face of said pinion in register with and cooperating with the circumferential grooves in said roll to centrally slit a sales tax check as it is fed between said roll and pinion, a cross shaft between the side walls on which said pinion and slitting devices are journaled, a cross shaft for pivotal support of a roll of sales tax checks between the side walls of said unit, a stripping blade extending tangentially through the grooves in said corrugating roll for raising and stripping the slitted portion of a check as the strip is advanced by the feeding means, and a severing blade supported in relation to said strip for severing it as the sales tax checks are fed out.

3. A unit structure for delivering a sales tax strip comprising side walls, a main corrugated roll, a circumferential groove on the face of said corrugated roll, a shaft for supporting said roll, a corrugating pinion coacting with said roll, projecting slitting cutters extending from the face of said pinion and in register with and cooperating with the circumferential groove in said roll to centrally slit a sales tax check, a cross shaft on which said pinion and slitting devices are journaled, a cross shaft for pivotal support of a roll of sales tax checks between the side walls of said unit, a stripping blade extending tangentially through the grooves in said corrugating roll for raising and stripping the slitted portion of a check as the strip is advanced by the feeding means, and a severing blade supported in relation to said strip for severing it as the sales tax checks are fed out.

4. A unit structure for delivering a sales tax strip comprising side walls, a main corrugated roll, a circumferential groove at the center of said corrugated roll, a shaft for supporting said roll, a corrugating pinion coacting with said roll, projecting slitting cutters extending from the face of said pinion and in register with and cooperating with the circumferential grooves in said roll to centrally slit a sales tax check, a stripping blade extending tangentially through the grooves in said corrugating roll for raising and stripping the slitted portion of a check as the strip is advanced by the feeding means, and a severing blade supported in relation to said strip for severing it as the sales tax checks are fed out.

5. A unit structure for delivering a sales tax strip comprising side walls, a main corrugated roll, a circumferential groove at the center of said corrugated roll, a shaft for supporting said roll, a corrugating pinion coacting with said roll, a projecting slitting cutter extending from the face of said pinion and cooperating with the circumferential grooves in said roll to centrally slit a sales tax check, and a severing blade supported in relation to said strip for severing it as the sales tax checks are fed out.

6. A unit structure for delivering a sales tax strip comprising side walls, a main corrugated roll, a circumferential groove at the center of said corrugated roll, a shaft for supporting said roll, a corrugating pinion coacting with said roll, and a projecting slitting cutter extending from the face of said pinion and in register with and cooperating with the circumferential grooves in said roll to centrally slit a sales tax check as it is fed between said roll and pinion.

7. In a machine for cancelling and delivering sales tax checks, the combination of a corrugating roll with a central peripheral groove through the said corrugations, a coacting corrugated pinion, and a slitting blade in register with said groove and associated with the coacting roll and adapted to coact with the said peripheral groove to slit within its margins the sales tax receipt corrugated by said rolls as it is fed between the roll and pinion.

8. In a sales tax receipt cancelling and delivering device, the combination of coacting feed rolls, one of which is provided with a peripheral groove and the other of which is provided with a projecting slitter in register with said groove to cooperate with said groove to act upon and slit a sales tax receipt as it is fed between said rolls for cancellation purposes within its margins.

9. In a sales tax receipt cancelling and delivering device, the combination of coacting corrugated feed rolls, one of which is provided with a peripheral groove and the other of which is provided with a projecting slitter in register with said groove to cooperate with said groove to act upon and slit a sales tax receipt as it is fed between said rolls for cancellation purposes within its margins, and a stripper blade within said groove to remove the slitted strip.

10. In a machine for cancelling and delivering sales tax receipts, the combination of coacting feed rolls, one of which is provided with a peripheral groove and the other of which is provided with a projecting slitter in register with said groove to cooperate with said groove to act upon and slit a sales tax receipt as it is fed between said rolls for cancellation purposes within its margins, and a stripper blade within said groove to remove the slitted strip.

ALBERT MELHMAN.
MORRIS SHERAS.